United States Patent [19]
Steele et al.

[11] Patent Number: 5,633,572
[45] Date of Patent: May 27, 1997

[54] BACK-UP POWER SUPPLY WITH REPLACEABLE BATTERY PACK

[75] Inventors: Steven W. Steele, Rochester; Vernon J. Kleve, Pine Island; Willard J. Olson, Rochester; Gary A. Thompson, Pine Island, all of Minn.

[73] Assignee: International Business Machines Corporation, Armonk, N.Y.

[21] Appl. No.: 531,466

[22] Filed: Sep. 21, 1995

[51] Int. Cl.⁶ .................................................. H01R 13/62
[52] U.S. Cl. ........................................................ 320/2
[58] Field of Search .............................. 320/2, 14, 15, 320/49; 307/10.6; 429/9, 150, 160, 179

[56] References Cited

U.S. PATENT DOCUMENTS

| | | | |
|---|---|---|---|
| 5,153,817 | 10/1992 | Hosoi et al. | 361/393 |
| 5,162,164 | 11/1992 | Dougherty et al. | 429/9 |
| 5,224,870 | 7/1993 | Weaver et al. | 439/157 |
| 5,225,293 | 7/1993 | Mitchell et al. | 429/97 |
| 5,251,105 | 10/1993 | Kobayashi et al. | 361/683 |
| 5,272,598 | 12/1993 | Kobayashi et al. | 361/686 |
| 5,309,031 | 5/1994 | Stewart et al. | 307/66 |
| 5,331,506 | 7/1994 | Nakajim | 361/683 |
| 5,350,317 | 9/1994 | Weaver et al. | 439/500 |
| 5,525,888 | 6/1996 | Toya | 320/2 |

*Primary Examiner*—Aditya Krishnan
*Attorney, Agent, or Firm*—Merchant, Gould, Smith, Edell, Welter & Schmidt

[57] ABSTRACT

A back-up power supply includes a fixed charger fixably mounted in an enclosure of a computer system and having a charging circuit electrically coupled to the computer system. The charger is mounted in a case which houses the charging circuit and provides EMC shielding. A removable battery pack is docked with the charger through cooperative blind docking connectors to electrically couple a pair of batteries with the charging circuit. The batteries are enclosed within a case to substantially restrict external access to the batteries. Preferably, the batteries together form an "L" shape, and the charging circuit is disposed on a circuit board having low and high profile areas. The batteries in the battery pack are disposed adjacent the low profile areas of the circuit board, such that the overall space required for the power supply is reduced.

20 Claims, 7 Drawing Sheets

BACK-UP POWER SUPPLY WITH REPLACEABLE BATTERY PACK

FIELD OF THE INVENTION

The invention relates to a back-up power supply for an electronic system and a battery pack for use therewith. In particular, the invention relates to a back-up power supply for use in high end computer applications, and having a replaceable battery pack.

BACKGROUND OF THE INVENTION

Back-up, or uninterruptable, power supplies have numerous uses in electronics applications to provide a back-up power source to a primary power system, such as AC line power, or a primary battery system. A particular use for such systems is in high end computer applications, such as mainframes, minicomputers, supercomputers, network servers, and the like to prevent data loss during an interruption of the primary power to the computer. For example, the AS/400 minicomputer system manufactured by International Business Machines Corp. includes an internal back-up power supply which is used to provide back-up power and shorten the IPL time after an AC main power failure. One design of an internal back-up power supply useful for the AS/400 minicomputer includes an integrated battery charger, system interface circuit and batteries that are mounted in a single case in an enclosure in the AS/400 system.

Many back-up power supplies include one or more batteries which have only limited lives and must be replaced periodically. For example, the AS/400 computer system uses lead acid batteries that have been found to last about 4 years before needing to be replaced.

However, there are several drawbacks associated with the replacement of the batteries in many conventional back-up power supplies. For example, the batteries used in such systems are typically integrated with the charger and system interface circuitry, and thereby require all the components to be replaced together even though the circuitry may still be operational. Moreover, replacement of batteries in conventional systems is typically performed by calling service personnel due to the substantial labor and expertise required to replace the batteries. In addition, replacement of batteries may require the computer system to be shut down in part or in whole, thereby resulting in some loss of productivity.

All of the above drawbacks result in higher operating costs and greater inconvenience for owners and operators of such systems. Therefore, a substantial need has arisen for a simple-to-maintain back-up power supply which permits used batteries to be replaced by an owner or operator without having to call service personnel, without having to replace all of the charger and other supporting electronic components, and without requiring the system to be shut down.

SUMMARY OF THE INVENTION

The invention addresses these and other problems associated with the prior art in providing a back-up power supply for an electronic system having a replaceable battery back which docks with a fixed charger mounted in the electronic system. The battery pack is coupled through a blind docking connector to facilitate removal and replacement of the battery pack. In addition, the battery pack is preferably removable and replaceable while the electronic system is operational, without the use of any tools or any particular expertise. Moreover, the battery pack is preferably substantially enclosed to restrict external access to the batteries housed therein. This results in a safe and simple system for replacing the batteries. Consequently, the need to call outside service personnel to replace the batteries is often eliminated.

In preferred embodiments of the invention, two batteries are arranged within a battery pack in a manner to minimize the space occupied by the battery pack. The battery pack is designed to cooperatively mate with a fixed charger such as the batteries occupy spaces adjacent low profile areas of a circuit card used in the charger. Preferably, one battery is oriented orthogonal to a second battery, leaving a notched area between the batteries for receiving a high profile area of the circuit card on which to mount any oversized electronic components which tend to protrude a substantial distance off of the surface of the circuit card.

Therefore, in accordance with one aspect of the invention, an apparatus is provided for providing back-up power in an electronic system. The apparatus includes a fixed charger mounted in the electronic system, the charger including a charging circuit electrically coupled to the electronic system, a case housing the charging circuit, and a blind docking connector electrically coupled to the charging circuit; and a removable battery pack docked with the charger, the battery pack including a battery electrically coupled to the charging circuit through a blind docking connector mating with the connector on the charger and a case housing the battery to enclose the battery and thereby substantially restrict external access to the battery.

In accordance with an additional aspect of the invention, a removable battery pack is provided for docking with a fixed charger of the type having a charging circuit disposed on a circuit card and housed within a case, the circuit card of the type including a first portion having an oversized electronic component mounted thereto, and a second portion having a low profile. The battery pack includes first and second batteries; and a case housing the batteries with the second battery extending generally orthogonal to the first battery and with the first and second batteries occupying a volume generally adjacent the second portion of the circuit card.

In accordance with a further aspect of the invention, a computer system is provided which includes a back-up power supply. The back-up power supply includes a fixed charger mounted in the apparatus, the charger including a charging circuit electrically coupled to the computer system and an EMC shielded case housing the charging circuit; and a removable battery pack docked with the charger through cooperative blind docking connections on the battery pack and the charger, the battery pack including first and second batteries electrically coupled to the charging circuit through the connections and a case housing the batteries to enclose the batteries and thereby substantially restrict external access to the batteries, wherein the charger shields the computer system when the battery pack is not docked to the charger.

These and other advantages and features, which characterize the invention, are set forth in the claims annexed hereto and forming a further part hereof. However, for a better understanding of the invention, and the advantages and objectives obtained by its use, reference should be made to the drawing, and to the accompanying descriptive matter, in which there is described preferred embodiments of the invention.

DETAILED DESCRIPTION OF THE PREFERRED EMBODIMENTS

Figure 1:
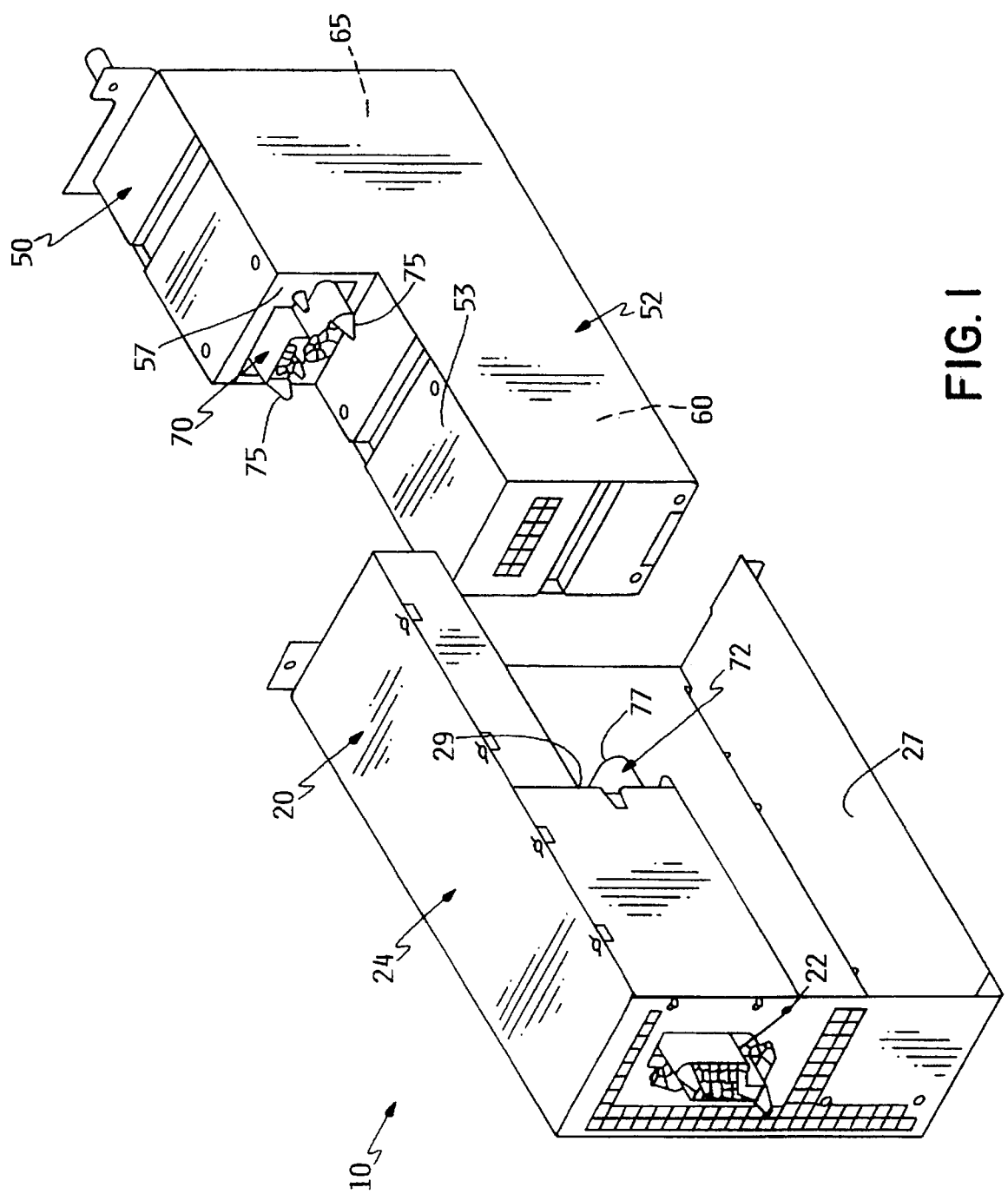
FIG. 1 is a partially exploded perspective view of a preferred back-up power supply consistent with the principles of the invention.

Turning to the Drawing, wherein like numbers denote like parts thereof throughout the several views, FIG. 1 shows a preferred back-up power supply 10 consistent with the principles of the present invention. Power supply 10 generally includes a fixed charger 20 having a case 24 which is mounted within an enclosure in an electronic system. A system connector 22 electrically connects the charger with the electronic system.

A removable battery pack 50 docks with charger 20 and includes first and second batteries 60, 65 housed within a case 52. A connector 70 on battery pack 50 mates with a docking connector 72 on fixed charger 20 to electrically connect the battery pack to the charger.

The preferred application for back-up power supply 10 is in an AS/400 minicomputer system manufactured by International Business Machines Corp. In particular, the cases of the charger and battery pack in the preferred power supply are designed to fit in the same enclosure as a conventional integrated back-up power supply. Use of the preferred power supply in the AS/400 system minimizes the space required for the power supply, and further provides a diagnostic capability to enable the main processing network to monitor its status.

It will be appreciated, however, that many other applications may benefit from the use of the preferred power supply, including many high end computer systems such as mainframes, minicomputers, super computers, network servers, or other computer systems where the loss of data due to power loss is an important concern. Moreover, even some desk top or personal computer applications, or other electronic systems where it is desirable to maintain an uninterruptable source of power may also benefit from the preferred power supply.

Figure 3A:
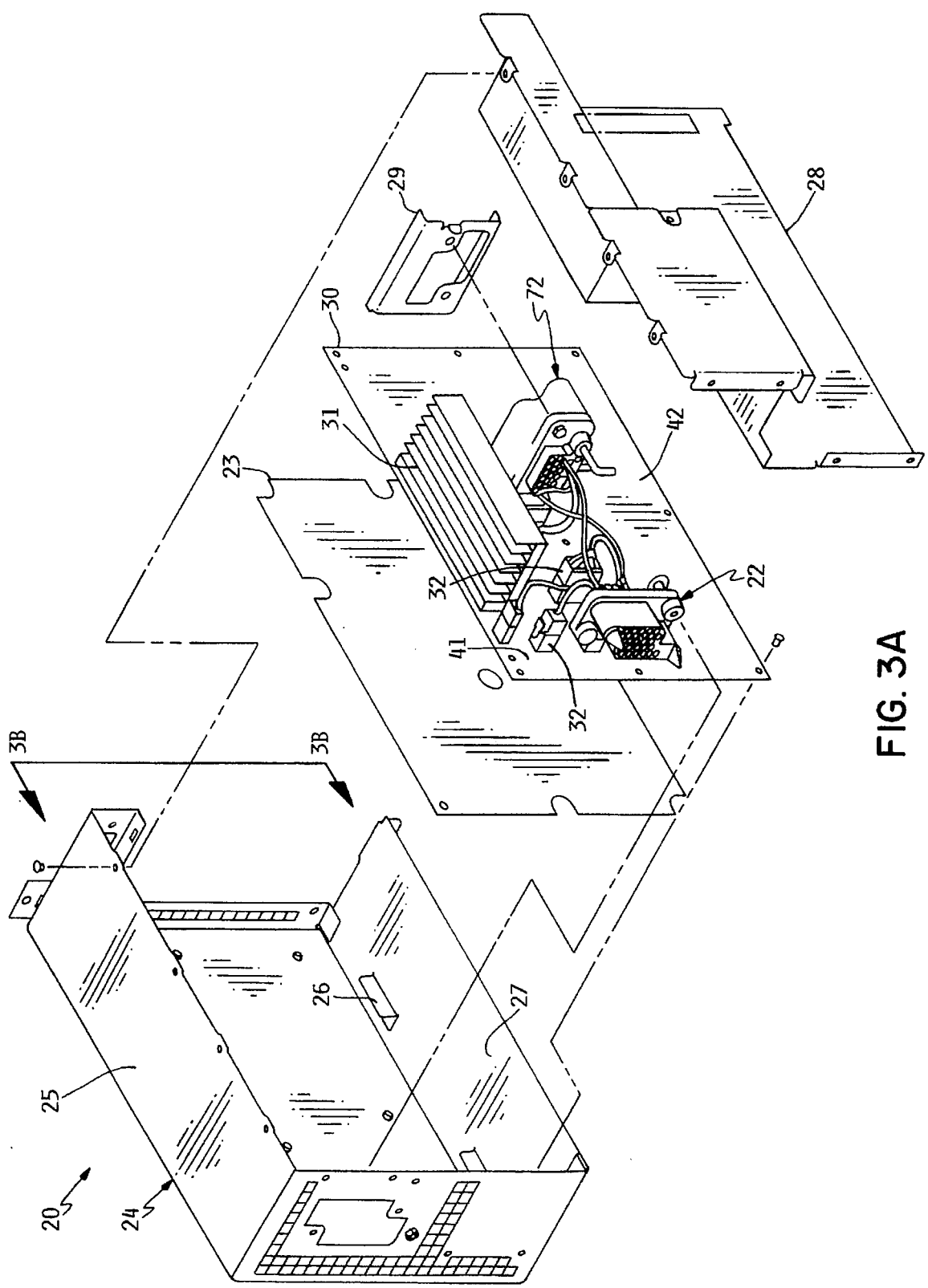
FIG. 3A is a partially exploded perspective view of the fixed charger in the power supply of FIG. 1.
Figure 3B:
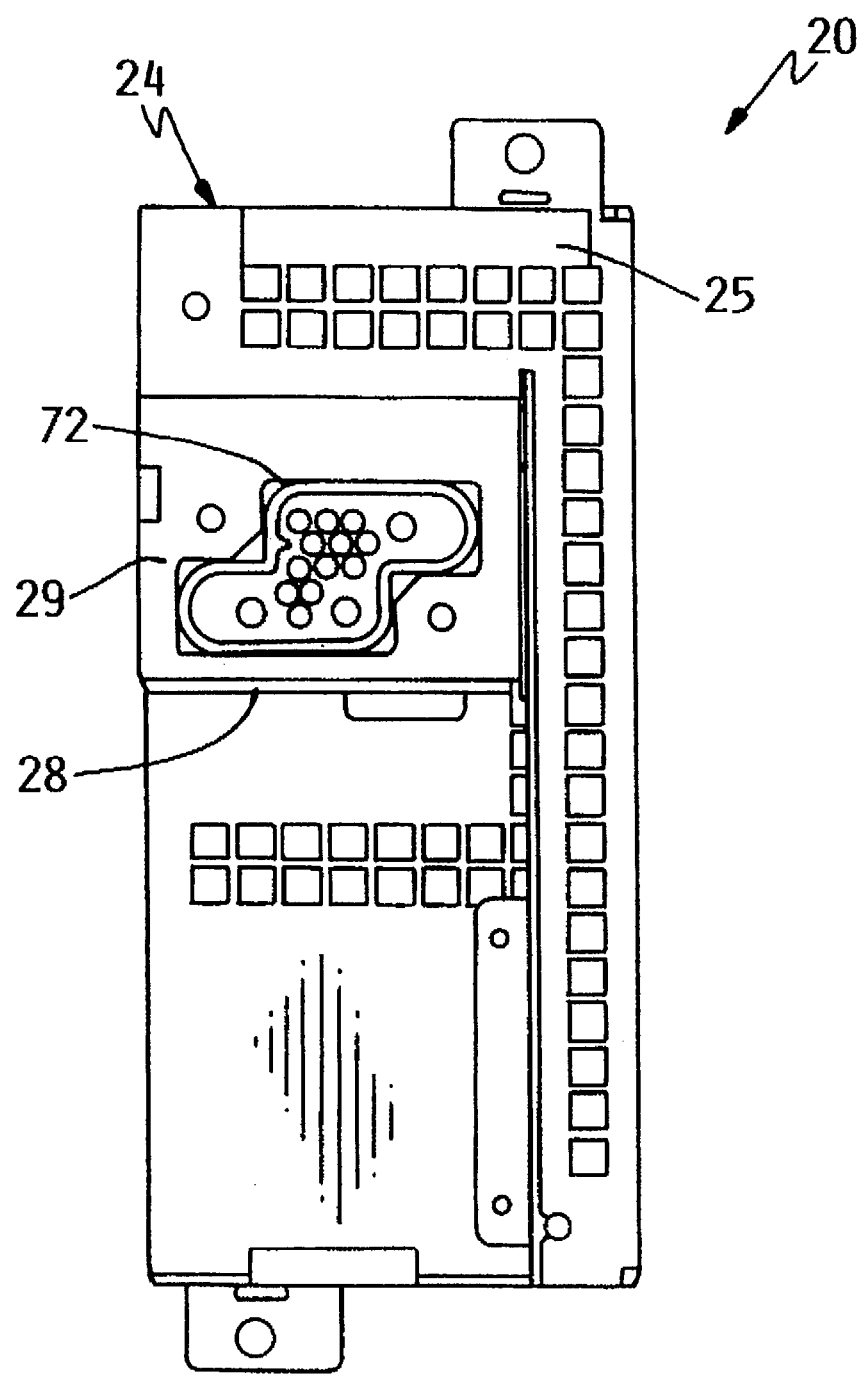
FIG. 3B is an end elevational view of the fixed charger, taken along line 3B—3B of FIG. 3A.

Fixed charger 20 is shown in greater detail in FIGS. 3A and 3B. Charger 20 handles the interface between the computer system and the battery pack, maintains a charge on the batteries, supplies a back-up source of power when a power failure is detected, and performs diagnostics on the power supply. Charger 20 includes a case 24 preferably formed of three sheet metal members 25, 28 and 29 which are held together by a plurality of machine screws or other suitable fasteners. The sheet metal construction of case 24 provides electromagnetic compatibility (EMC) shielding both for the electronic components within the charger, as well as for the computer system as a whole when the battery pack is removed. As discussed above, case 24 preferably fits in the enclosure provided in an AS/400 computer system for a back-up power supply. It is also preferred that case 24 be fixably mounted within the enclosure, e.g. with one or more machine screws, so that a customer may not easily remove the charger. It will of course be appreciated that other designs, materials, and assembly processes may be used for case 24 depending on the particular application where the case is used, as well as the configuration of electronic circuitry and batteries used within the charger.

Charger 20 also includes a circuit board 30 mounted within case 24 by a plurality of machine screws. Board 30 is supported by a plurality of tabs 26 on member 25, and is isolated from case 24 and shielded by a polypropylene shield 23 interposed between the case and the circuit board.

Circuit board 30 is segregated into first and second portions 41 and 42 which are designed to provide, respectively, a high profile area for mounting any oversized components in the electronic circuitry, and a low profile area devoid of any such components.

Components which may be mounted within first portion 41 may include any "oversized" electronic component such as heat sinks, transformers, coils, relays, power transistors, voltage regulators, connectors, high current wiring, diodes, etc. which protrude off of the surface of the board. It will be appreciated that every power supply/charger will necessarily require some of these oversized components due to the relatively high currents, power and heat generation associated with such circuits. For example, a heat sink 31 and a plurality of connectors 32 are shown disposed within first portion 41. Of course, depending upon the particular circuitry used in the charging circuit, other "oversized" components may also be mounted within this area.

Second portion 42 of circuit board 30 is designated a low profile area of the circuit board which is devoid of any "oversized" components. Any electronic components which are disposed within this area project only minimally off of the surface of the circuit board. For example, many integrated circuits, capacitors, resistors, switching transistors, diodes, and some transformers may have suitable profile characteristics for being mounted within this area. The purpose of the low profile area of the circuit board is to provide spacing adjacent the circuit board for receiving the battery pack and thereby minimize the amount of space required by the entire assembly.

It is preferred that the low profile area of circuit board 30 has a component height of no more than about 1 centimeter (about 0.4 inches), with any components requiring greater than this height being relegated to the first portion 41. However, other component heights may be suitable in other applications.

Circuit board 30 also includes a system interface connector 22 which electrically couples the charger to the computer system, as well as a blind docking connector 72 which electrically couples with the battery pack. Members 28 and 29 of case 24 enclose the circuit board within the case. Accordingly, it will be appreciated that members 28 and 29 of case 24 generally define the first and second portions 41 and 42 of the circuit board in the preferred embodiment. However, it will be appreciated that the profile of the case may vary from the low and high profile areas of the circuit board based upon other design requirements, such as the particular size and shape of batteries and case used in the battery pack.

It will be appreciated that charger 20 may take different configurations consistent with the invention. For example, the charger circuitry may be disposed on a plurality of circuit boards, each having high and/or low profile areas, and with the case taking different shapes depending upon the particular applications. In addition, the charger circuitry which provides the preferred operation of the charger (as discussed in greater detail below), may also be varied depending upon different functional, power handling, etc. requirements.

Figure 4A:
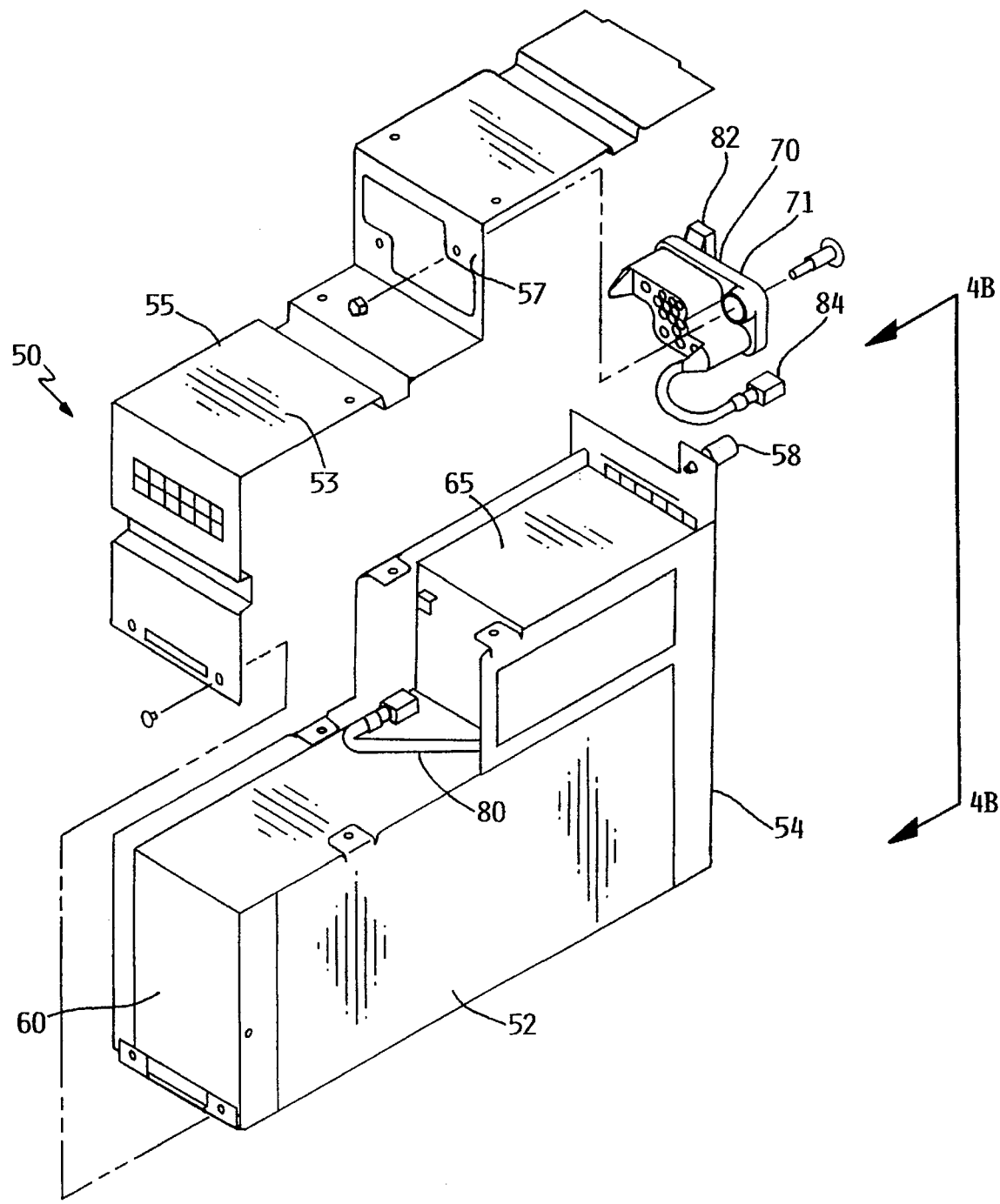
FIG. 4A is a partially exploded perspective view of the battery pack in the power supply of FIG. 1.
Figure 4B:
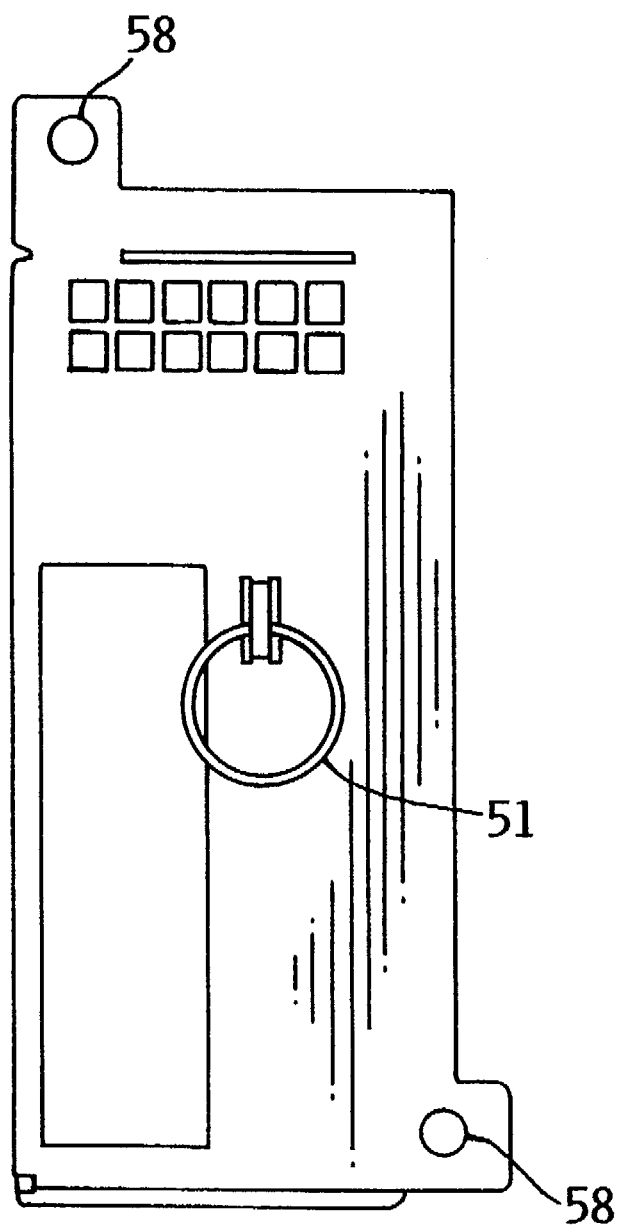
FIG. 4B is an end elevational view of the battery pack, taken along line 4B—4B of FIG. 4A.

Removable battery pack 50 is shown in greater detail in FIGS. 4A and 4B. Battery pack 50 provides a substantially enclosed and easily docked source of power for supply 10, so that a relatively unskilled operator may quickly and safely remove and replace battery packs once their useful life has been exceeded.

Battery pack 50 includes a case 52 which retains and encloses batteries 60, 65 to restrict external access thereto. This is particularly important when using batteries that include caustic, toxic or otherwise harmful materials to protect personnel should the batteries ever leak. Preferably the only external access to the battery pack is an electrical connection provided through a single docking connector 70 discussed below.

Case 52 includes a pair of sheet metal panels 54, 55 secured to one another using machine screws. The sheet metal construction encloses the battery and additionally provides some degree of EMC shielding, both for the battery pack and for the computer system as a whole when the battery pack is installed. It will be appreciated, however, that other materials including other metals and plastics, as well as other assembly processes, e.g. plastic injection molding, may also be used to construct battery pack 50.

Batteries 60, 65 are disposed within case 52. Batteries 60, 65 are preferably lead acid batteries, e.g., 12 Volt/7 Amp-hour sealed lead acid batteries manufactured by Yuasa-Exide, among others, which are capable of providing 800 Watts of power at 20 VDC for at least 2 ½ minutes. However, any number and/or types of batteries may be used consistent with the invention.

First battery 60 has a longitudinal axis which extends generally parallel to the direction in which the pack is inserted and removed from charger 20. Second battery 65 extends generally orthogonal to the first battery to form a general "L" shape. This results in case 52 having a notch 53 formed therein for receiving the high profile area of circuit board 30.

It will be appreciated that both batteries are oriented such that they will be disposed proximate the low profile area of the circuit board on the charger to minimize the overall space required for the power supply. In particular, both batteries occupy a volume adjacent the second portion of the board with the notch in the battery pack surrounding the perimeter of the high profile first portion of the circuit board. Other orientations of the batteries are also possible, although the alternative orientations may require additional space. It has been found that the preferred orientation of batteries substantially minimizes the overall space required for the power supply.

Battery pack 50 preferably includes a minimum number of components to reduce the cost and complexity of replacement packs. Preferably, batteries 60, 65, connector 70, and jumpers 71, 80, 82 and 84 connecting the same are the only components housed within case 52.

Charger 20 and battery pack 50 are coupled to a pair of cooperative blind docking connectors 70, 72 which are best shown in FIGS. 1, 3A and 4A. Connectors 70, 72 provide the sole electrical connection between battery pack 50 and charger 20.

The preferred connectors 70, 72 are blind docking connectors which are capable of handling at least 40 amps of current per connection (or pin) in at least some of the connections provided on the connectors. For example, suitable connectors which have pins rated at 50 amps per pin are manufactured by AMP of Pennsylvania. For battery pack 50, connector 70 preferably includes a no. 213426-1 housing and no. 211161-1 sockets. For charger 20, connector 72 preferably includes a no. 213427-1 housing and no. 213552-2 pins.

These preferred connectors have adequate current carrying capacity per pin to allow for single crimped connectors to be used. In the alternative, multiple pins on alternate connectors may be used to provide the necessary current carrying capacity in less robust designs.

The connectors themselves are capable of providing 15 individual electrical connections (three of which are high current connections). In the preferred power supply, two of the high current connections are used for connecting the batteries with the charger. In addition, a second pair of low current connections operate as a jumper 71 for permitting the charger to detect when a battery pack has been removed, with the two connections on connector 70 being tied directly to one another to electrically connect the two connections on connector 72 when the battery pack is docked with the charger. However, the pair of connections forming the jumper need not be high current connections given the logical function provided by the jumper. It will be appreciated that other connectors may be used in the alternative.

Connector 70 on battery pack 50 is preferably a female connector having recessed sockets to limit the external access to the electrical connection both when the battery pack is removed from the charger, as well as during the installation and removal of the battery pack. Charger connector 72 is a male connector having suitable pins for mating with the sockets in connector 70.

Connectors 70, 72 also include cooperative male and female guide members 75, 77 which assist in the blind docking function by assisting in the alignment of the connectors when a battery pack is being docketed into the charger. It is preferable that male members 75 be provided on battery pack connection 70, although the opposite configuration may also be used in the alternative.

Male guide members 75 preferably have a generally conical shape, with corresponding conical recesses or apertures being formed in female members 77. This, coupled with the spacing between case 52 of battery pack 50 and the interior enclosure 27 formed in case 24 of charger 20 (see FIG. 1), generally ensures that a battery pack inserted into the charger will align to properly connect connectors 70, 72 without any particular guidance by the operator inserting the battery pack. Docking of the battery pack with a charger only requires placing the battery pack within the enclosure of the charger, and pressing the battery pack into place.

It will be appreciated that other guide members and designs thereof, including separate guide members provided on other areas of the cases, may also be used in the alternative to facilitate the automatic alignment of the battery pack with the charger. In general, it is preferable to provide connectors which permit this "blind" docking so that an operator does not need to view the connectors during docking or take any significant degree of care in aligning the connectors.

Figure 2:
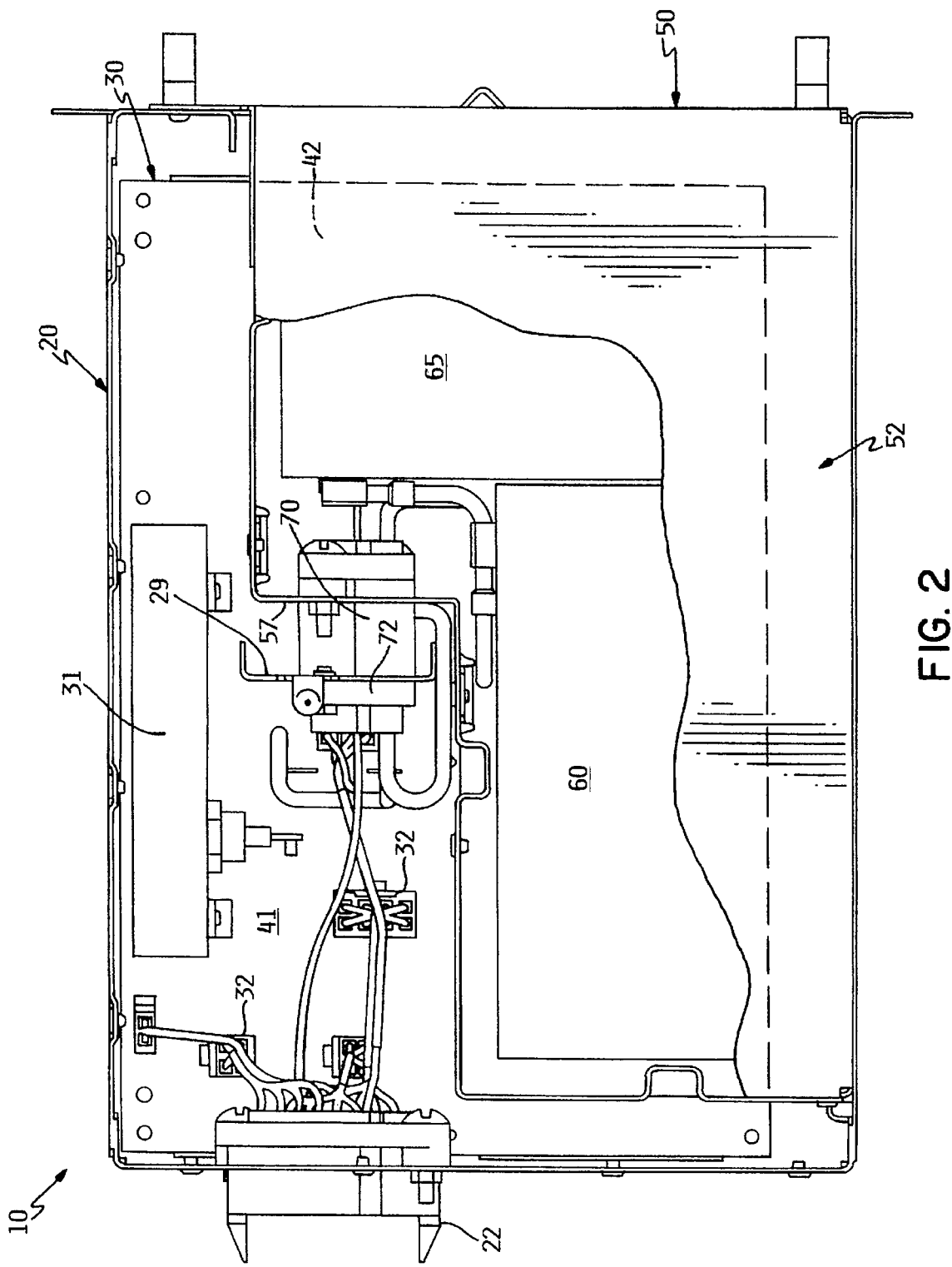
FIG. 2 is a side view of the power supply of FIG. 1, with portions thereof cut away.

As shown in FIG. 2, connectors 70, 72 are preferably located on adjacent and opposing surfaces on the battery pack and the charger (members 57 and 29, respectively)

which are generally normal to the direction of insertion and removal. This orientation of connectors permits the connectors to be joined merely by pushing the battery pack into place. Moreover, the connectors are substantially hidden within the enclosure when the battery pack is docked to restrict any external access to the connectors while the battery pack is docked. However, other positions for the connectors may also be used.

Figure 5:
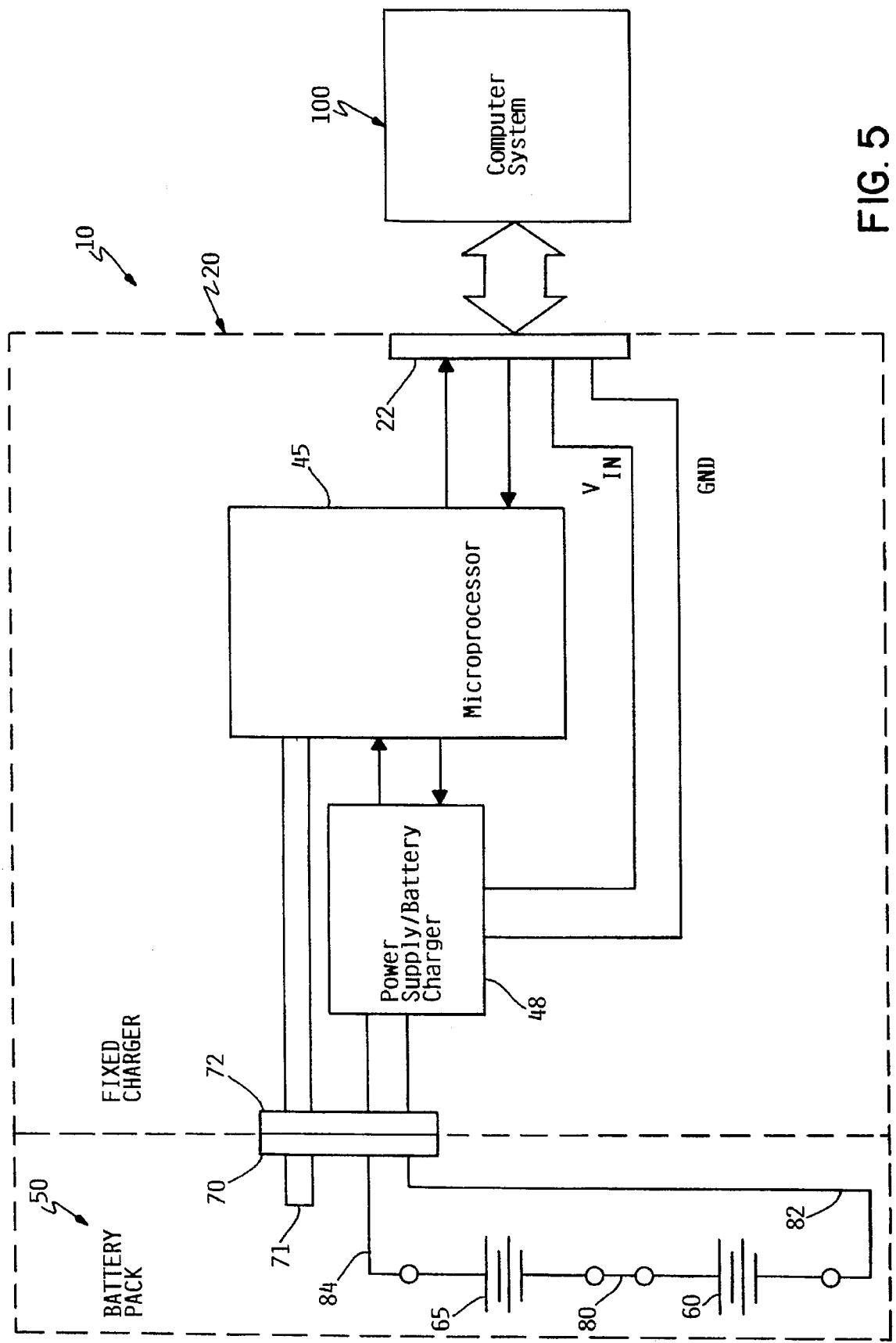
FIG. 5 is a functional block diagram of the primary circuit components in the power supply of FIG. 1.

FIG. 5 illustrates the primary components in the charging circuit of power supply 10. The charging circuit provides the overall control of back-up power supply 10, having a primary function of maintaining a charge on the batteries within battery pack 20. In addition, the charging circuitry includes a power supply capability for detecting and supplying power in the event of a power failure in the main power system of an electronic or computer system 100, a diagnostic capability for determining the status of the batteries and providing an indication when a battery pack needs to be replaced, as well as a system interface capability for providing such information to the main electronic or computer system.

The charging circuit of charger 20 is controlled by a microprocessor 45 having program data stored in a read only memory, with working space provided in a random access memory. Both memories are preferably incorporated into microprocessor 45, although they may be provided as separate devices in other applications. Microprocessor 45 controls a power supply/battery charger block 48 which includes the high power components used to both supply power for charging the batteries, and to provide a source of power to the computer system in the event of a power failure.

Power supply/battery charger 48 is preferably a feed forward high frequency switching power supply with an isolated transformer, the design of which is generally understood in the art. Processor 45 receives information from block 48 such as battery voltages and charging current. Processor 45 is also capable of controlling block 48 to switch the charger on and off.

Power supply/battery charger block 48 preferably includes interface circuitry providing "hot" connections and disconnections between connectors 70 and 72 such that a battery pack may be removed and replaced without removing power to the charger, or without even powering down or changing the state of the computer system as a whole. The provision of "hot" connections may be performed in any manner generally known in the art.

Batteries 60 and 65 of battery pack 50 are connected to power supply/battery charger 48 through a pair of jumpers 82, 84. Moreover, the positive terminal of battery 60 is coupled to the negative terminal of battery 65 through a jumper 80. All of jumpers 80, 82 and 84 are further illustrated in FIG. 4A, for example.

Charger 20 is also coupled through connector 22 to computer system 100. A pair of bi-directional power lines (labeled $V_{IN}$ and GND in FIG. 5) are provided in connector 22 to couple the batteries to the computer system. Processor 45 also communicates with computer system 100 through a serial interface such that the computer system may poll power supply 10 to determine the status of the charger and the battery pack. Moreover, processor 45 is also capable of informing the computer system when a battery pack is not installed such that the system will ignore the charger when the battery pack is removed so that no battery back-up related errors will occur. Processor 45 detects the removal of a battery pack through the above-described jumper connection 71.

The various components required to implement the charging circuits of charger 20 will generally be understood by one of ordinary skill in the art. For example, one suitable charger configuration, as well as routines for controlling the charger, are disclosed in U.S. patent application Ser. No. 08/291,990, filed on Aug. 17, 1994 by Steven D. Keidl et al. and entitled "Battery Charging Method and Apparatus Using Current Control" (IBM Docket No. R0994-032), which is incorporated by reference herein. The particular components and design implementing charger 20 are not required for an understanding of the operation of the invention, and thus will not be discussed in further detail herein.

Removal and replacement of a battery pack 50 in charger 20 is performed as follows. Typically, computer system 100 will determine through charger 20 that a battery pack needs to be replaced, generally by sensing when batteries fail to adequately hold a charge. Charger 20 then notifies the computer system, which subsequently notifies an operator through a system SRC that the battery pack needs to be replaced.

An operator then removes a cover and an EMC shield provided over the enclosure in the computer system. The battery pack is removed by loosening a pair of captivated thumb screws 58 on the battery pack, and pulling out the old battery pack using a key ring 51. Screws 58 and key ring 51 are shown in greater detail in FIG. 4B.

To replace the battery pack, a new battery pack is inserted into the enclosure in the charger, then the battery pack is pressed into place, with the automatic blind docking forming a connection between connectors 70 and 72 without any precise alignment by the operator. Then, the operator tightens thumb screws 58 and replaces the EMC shield and cover.

Several advantages are realized through the use of the preferred back-up power supply. First, battery packs are replaceable by operators safely and easily, and without separate tools. All mechanical connections, such as thumb screws, are manually manipulated. Moreover, the auto docking feature permits a battery pack to simply be pushed in a position without having to precisely align the connectors. Moreover, the pack may be removed and replaced "hot", without having to shut down the charger or the computer system, and without interrupting the normal operation of the computer system. Second, the pack has minimal components beyond the batteries, thereby minimizing the cost and complexity of the replacement battery packs. Third, the pack is enclosed and the connectors on the battery pack are recessed within the blind docking connector to minimize exposure of the customer to dangerous chemicals or electrical currents, etc. Other advantages may also be realized by the above-described embodiments.

Various changes may be made to the preferred embodiments without departing from the spirit and scope of the invention. Therefore, the invention lies in the claims hereinafter appended.

What is claimed is:

1. An apparatus for providing back-up power in an electronic system, the apparatus comprising:
   (a) a fixed charger mounted in the electronic system, the charger including a charging circuit electrically coupled to the electronic system, a case housing the charging circuit, and a blind docking connector electrically coupled to the charging circuit; and
   (b) a removable battery pack docked with the charger, the battery pack including a battery electrically coupled to the charging circuit through a blind docking connector mating with the connector on the charger and a case housing the battery to enclose the battery and thereby substantially restrict external access to the battery.

2. The apparatus of claim 1, wherein the charging circuit is disposed on a circuit card having a first portion and a second portion, the second portion of the circuit card devoid of oversized electronic components, and wherein the battery occupies a volume generally adjacent the second portion of the circuit card.

3. The apparatus of claim 2, wherein the battery pack includes a second battery extending generally orthogonal to the first battery, and wherein the first and second batteries both occupy volumes generally adjacent the second portion of the circuit card.

4. The apparatus of claim 1, wherein the connectors on the battery pack and the charger circuit include cooperative male and female guide members to facilitate blind docking and are disposed on adjacent and opposing surfaces of the charger and the battery pack; whereby the connectors are hidden when the battery pack is docked with the charger.

5. The apparatus of claim 1, wherein each connector includes a high current connection for coupling the battery to the charging circuit which is rated to handle a current of at least about 40 Amps.

6. The apparatus of claim 5, wherein each connector further includes a jumper connection for indicating when the battery pack is docked to the charger.

7. The apparatus of claim 6, wherein the charging circuit further includes a system interface circuit for communicating with the electronic system, the system interface circuit including means for disabling battery checking while the battery pack is not docked to the charger.

8. The apparatus of claim 5, wherein the charger provides a hot connection between the connectors; whereby the battery pack may be docked and undocked while the electronic system is operational.

9. The apparatus of claim 1, wherein the battery comprises a lead acid battery.

10. The apparatus of claim 1, wherein the charger casing is electromagnetic compatibility (EMC) shielded to shield the electronic system when the battery pack is not docked to the charger.

11. A removable battery pack for docking with a fixed charger of the type having a charging circuit disposed on a circuit card and housed within a case, the circuit card of the type including a first portion having an oversized electronic component mounted thereto, and a second portion devoid of oversized electronic components, the battery pack comprising:

(a) first and second batteries; and (b) a case housing the batteries with the second battery extending generally orthogonal to the first battery and with the first and second batteries occupying a volume generally adjacent the second portion of the circuit card, the first and second batteries defining an "L" shape and thereby defining a notch in the case for receiving the first portion of the circuit card.

12. The battery pack of claim 11, further comprising a blind docking connector for docking with a corresponding connector on the charger, wherein the batteries are substantially enclosed within the battery pack and wherein the only external connections to the batteries are through the connector.

13. The battery pack of claim 12, wherein the batteries and the connector are directly coupled by jumpers, and wherein no additional electronic components are disposed within the battery pack.

14. The battery pack of claim 12, wherein the connector includes a high current connection rated to handle a current of at least about 40 Amps.

15. The battery pack of claim 14, wherein the connector further includes a jumper connection for indicating when the battery pack is docked to the charger.

16. The battery pack of claim 14, wherein the connector is a female connector; whereby the electrical connections to the battery are recessed within the connector.

17. The battery pack of claim 11, wherein the batteries comprise lead acid batteries.

18. A computer system comprising a back-up power supply electrically coupled thereto, the back-up power supply comprising:

(a) a fixed charger mounted in the apparatus, the charger including a charging circuit electrically coupled to the computer system and an electromagnetic compatibility (EMC) shielded case housing the charging circuit; and (b) a removable battery pack docked with the charger through cooperative blind docking connections on the battery pack and the charger, the battery pack including first and second batteries electrically coupled to the charging circuit through the connections and a case housing the batteries to enclose the batteries and thereby substantially restrict external access to the batteries, wherein the charger shields the computer system when the battery pack is not docked to the charger.

19. The computer system of claim 18, wherein the charging circuit is disposed on a circuit card, the circuit card including a first portion having an oversized electronic component mounted thereto, and a second portion devoid of oversized electronic components, wherein the second battery extends generally orthogonal to the first battery, and wherein the first and second batteries occupy a volume generally adjacent the second portion of the circuit card.

20. The computer system of claim 18, wherein the computer system is a computer system selected from the group consisting of a minicomputer, a mainframe computer, a supercomputer, and a network server.

* * * * *